United States Patent
Patil et al.

(10) Patent No.: US 10,863,333 B2
(45) Date of Patent: Dec. 8, 2020

(54) FEDERATED INSERTION OF 3RD PARTY SOFTWARE AS A SERVICE FOR NETWORK SLICES

(71) Applicant: Cisco Technology, Inc., San Jose, CA (US)

(72) Inventors: Prashanth Patil, San Jose, CA (US); Ram Mohan Ravindranath, Bangalore Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 22 days.

(21) Appl. No.: 16/277,309

(22) Filed: Feb. 15, 2019

(65) Prior Publication Data

US 2020/0267520 A1 Aug. 20, 2020

(51) Int. Cl.
| | | |
|---|---|---|
| *H04W 4/00* | (2018.01) | |
| *H04W 4/50* | (2018.01) | |
| *H04W 8/08* | (2009.01) | |
| *H04W 12/06* | (2009.01) | |
| *H04W 48/18* | (2009.01) | |

(52) U.S. Cl.
CPC ............... *H04W 4/50* (2018.02); *H04W 8/08* (2013.01); *H04W 12/06* (2013.01); *H04W 48/18* (2013.01)

(58) Field of Classification Search
CPC .. H04W 72/042; H04W 76/27; H04L 5/0053; H04L 5/0007; H04L 5/0048
See application file for complete search history.

(56) References Cited

U.S. PATENT DOCUMENTS 9,578,014 B2    2/2017  Sondhi et al.
2009/0106200 A1*  4/2009  Salinas ................... G06F 16/70
(Continued)

FOREIGN PATENT DOCUMENTS

| WO | 2017200978 A1 | 11/2017 |
| WO | WO 2018/111295 A1 | 6/2018 |
| WO | WO 2018/137699 A1 | 8/2018 |

OTHER PUBLICATIONS

Taleb, Tarik, et al., "On Multi-Access Edge Computing: A Survey of the Emerging 5G Network Edge Cloud Architecture and Orchestration," May 18, 2017, pp. 1657-1681.
(Continued)

*Primary Examiner* — Atique Ahmed
(74) *Attorney, Agent, or Firm* — Polsinelli PC

(57) ABSTRACT

Systems, methods, and computer-readable mediums for federating an enterprise and a SaaS provider across one or more network slices of a network service provider. A SaaS provided by a SaaS provider for provisioning to an enterprise can be recognized. One or more network slices within a network of a network service provider between the enterprise and the SaaS provider can be identified. The one or more network slices can be used to provision the SaaS to the enterprise. As follows, the SaaS provider can be federated with the enterprise across one or more network service providers, including the network service provider. Specifically, the SaaS provider can be federated with the enterprise by uniquely associating the one or more network slices provided by the network service provider with the SaaS provisioned by the SaaS provider to the enterprise.

20 Claims, 9 Drawing Sheets

(56) References Cited

U.S. PATENT DOCUMENTS

| | | | |
|---|---|---|---|
| 2009/0185500 A1* | 7/2009 | Mower | H04L 12/4641 370/250 |
| 2009/0259683 A1* | 10/2009 | Murty | G06F 16/284 |
| 2009/0271324 A1* | 10/2009 | Jandhyala | G06Q 50/188 705/80 |
| 2010/0198730 A1* | 8/2010 | Ahmed | G06F 21/6209 705/50 |
| 2012/0054625 A1* | 3/2012 | Pugh | H04L 67/02 715/736 |
| 2012/0284776 A1* | 11/2012 | Sundaram | G06F 21/6218 726/4 |
| 2013/0054536 A1* | 2/2013 | Sengupta | G06F 16/21 707/654 |
| 2013/0067225 A1* | 3/2013 | Shochet | G06F 21/6209 713/165 |
| 2014/0047532 A1* | 2/2014 | Sowatskey | G06F 21/31 726/10 |
| 2016/0124742 A1 | 5/2016 | Rangasamy et al. | |
| 2018/0068132 A1* | 3/2018 | Zubair | G06F 21/44 |
| 2018/0139106 A1 | 5/2018 | Senarath et al. | |
| 2018/0167277 A1* | 6/2018 | Mahimkar | H04L 41/145 |

OTHER PUBLICATIONS

Valtenen, Kristiina, et al., "Creating Value Through Blockchain Powered Resource Configurations: Analysis of 5G Network Slice Brokering Case," 2018 IEEE Wireless Communications and Networking Conference Workshops (WCNCW), Apr. 15, 2018, 6 pages.

Backman, Jere, et al., "Blockchain Network Slice Broker in 5G, Slice Leasing in Factory of the Future Use Case," 2017 Internet of Things Business Models, Users, and Networks, IEEE, Nov. 23, 2017, 8 pages.

Pavon, Ignacio Labrador, et al., "Project: H2020-ICT-2014-2 5G NORMA Project Name: 5G Novel Radio Multiservice adaptive network Architecture (5G NORMA)," Jan. 1, 2017, 158 pages.

* cited by examiner

FEDERATED INSERTION OF 3RD PARTY SOFTWARE AS A SERVICE FOR NETWORK SLICES

TECHNICAL FIELD

The present technology pertains to federating Software as a Service (SaaS) providers with enterprises across network slices, and in particular to federating SaaS providers with enterprises across network slices of a network service provider based on network slices used to provision SaaSs provided by the SaaS providers to the enterprises.

BACKGROUND

Fifth generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with an Access and Mobility Management Function (AMF)/Mobility Management Entity (MME) for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices actually being used to provision the SaaSs to the enterprise. However, associating SaaSs and SaaS providers with network slices is extremely difficult to achieve without federation across enterprises, network service providers, e.g. 5G service providers, and SaaS providers. There therefore exist needs for systems and methods for providing federation across enterprises, network service providers, and SaaS providers to associate SaaSs and SaaS providers with network slices.

Further, an enterprise/subscriber may be part of many network slices, across a plurality of different network service providers. This further complicates associating SaaSs and SaaS providers with network slices used to provide the SaaSs to the enterprise across the different network service providers. There therefore exist needs for systems and methods for providing federation across enterprises, network service providers, and SaaS providers to associate SaaSs and SaaS providers with network slices across a plurality of network service providers.

Additionally, federation across enterprises, network service providers, e.g. 5G service providers, and SaaS providers is important with respect to maintaining security and enforcing policies. Specifically, federation can be used to ensure that policies of an enterprise for specific SaaSs are correctly enforced across network slices of one or more network service providers. There therefore exist needs for systems and methods for providing federation across enterprises, network service providers, and SaaS providers to associate SaaSs and SaaS providers with network slices for security and policy enforcement across the network slices.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
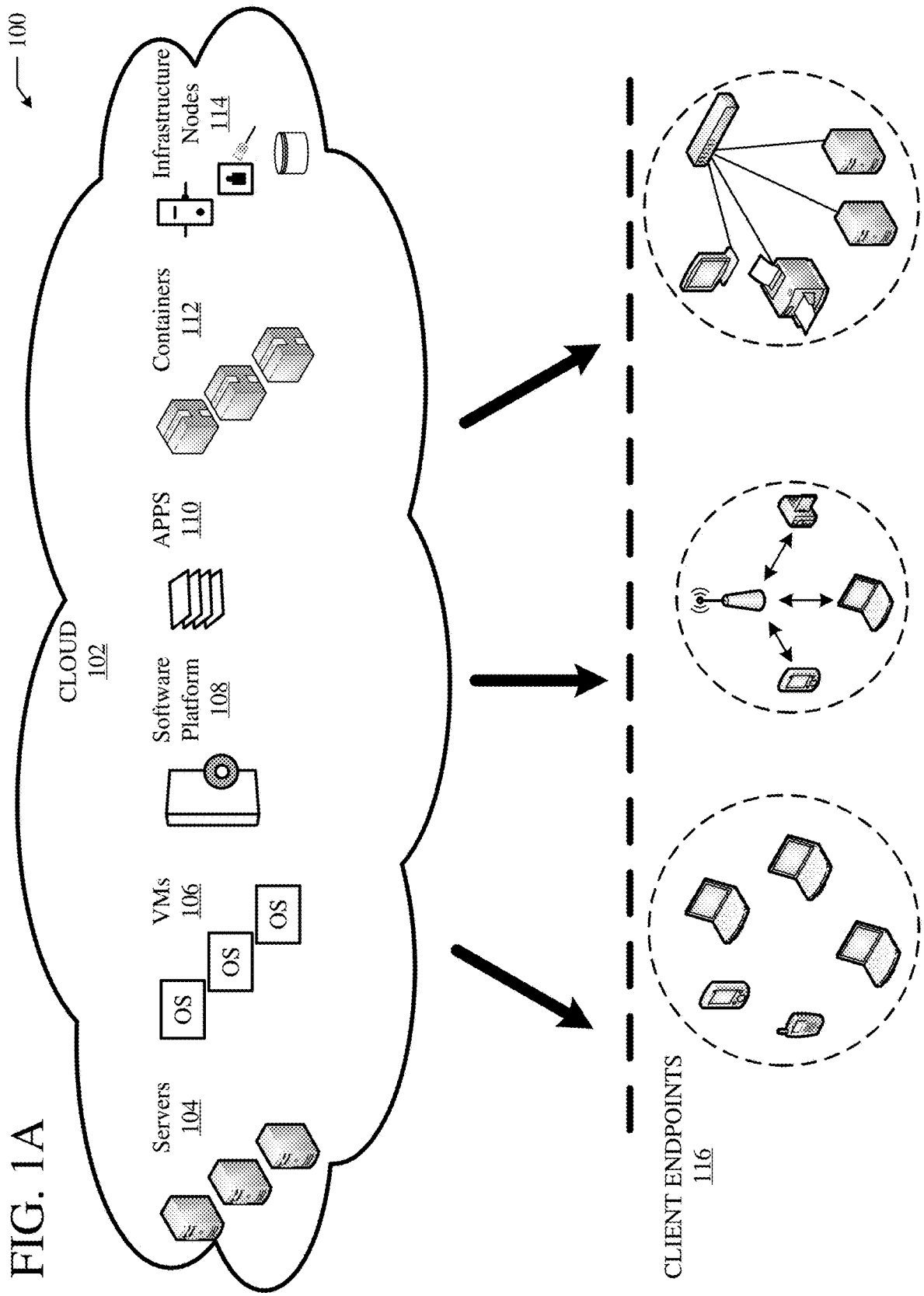
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include recognizing a SaaS provided by a SaaS provider for provisioning by the SaaS provider to an enterprise. Further, the method can include identifying one or more network slices within a network of a network service provider between the enterprise and the SaaS provider for provisioning the SaaS to the enterprise. As follows, the SaaS provider can be federated with the enterprise across one or more network service providers, including the network service provider used to provision the SaaS to the enterprise. Specifically, the SaaS provider can be federated with the enterprise by uniquely associating the one or more network slices provided by the network service provider with the SaaS provisioned by the SaaS provider to the enterprise using the one or more network slices.

A system can include one or more processors and at least one computer-readable storage medium storing instructions which, when executed by the one or more processors, cause the one or more processors to recognize a SaaS provided by a SaaS provider for provisioning by the SaaS provider to an enterprise. The instructions can cause the one or more processors to identify one or more network slices within a 5G network of a network service provider between the enterprise and the SaaS provider for provisioning the SaaS to the enterprise. The instructions can also cause the one or more processors to federate the SaaS provider with the enterprise across one or more network service providers including the network service provider used to provision the SaaS to the enterprise. Specifically, the instructions can cause the one or more processors to federate the SaaS provider with the enterprise by uniquely associating the one or more network slices provided by the network service provider with the SaaS provisioned by the SaaS provider to the enterprise using the one or more network slices.

A non-transitory computer-readable storage medium having stored therein instructions which, when executed by a processor, cause the processor to recognize a SaaS provided by a SaaS provider for provisioning by the SaaS provider to an enterprise. The instructions can cause the processor to identify one or more network slices within a network of a network service provider between the enterprise and the SaaS provider for provisioning the SaaS to the enterprise. The instructions can also cause the processor to federate the SaaS provider with the enterprise across one or more network service providers including the network service provider used to provision the SaaS to the enterprise. Specifically, the instructions can cause the processor to federate the SaaS provider with the enterprise by uniquely associating the one or more network slices provided by the network service provider with the SaaS provisioned by the SaaS provider to the enterprise using the one or more network slices. The instructions can also cause the processor to register an OAuth client of the SaaS for the one or more network slices between the enterprise and the SaaS provider as part of federating the SaaS provider with the enterprise across the one or more network slices. Enterprise client access to the SaaS through the one or more network slices can be controlled based on the OAuth client for each network slice of the one or more network slices.

Example Embodiments

The disclosed technology addresses the need in the art for federating SaaS providers with enterprises across network slices. Additionally, the disclosed technology address the need in the art for federating SaaS providers with enterprises across network slices in order to manage SaaSs provided by the SaaS providers to the enterprises. The present technology involves system, methods, and computer-readable media federating SaaS providers with enterprises across network slices used to provision SaaSs to the enterprises by the SaaS providers. Additionally, the present technology involves systems, methods, and computer-readable media for federating SaaS providers with enterprises across network slices in order to manage SaaSs provisioned by the SaaS providers to the enterprises across the network slices.

Figure 1B:
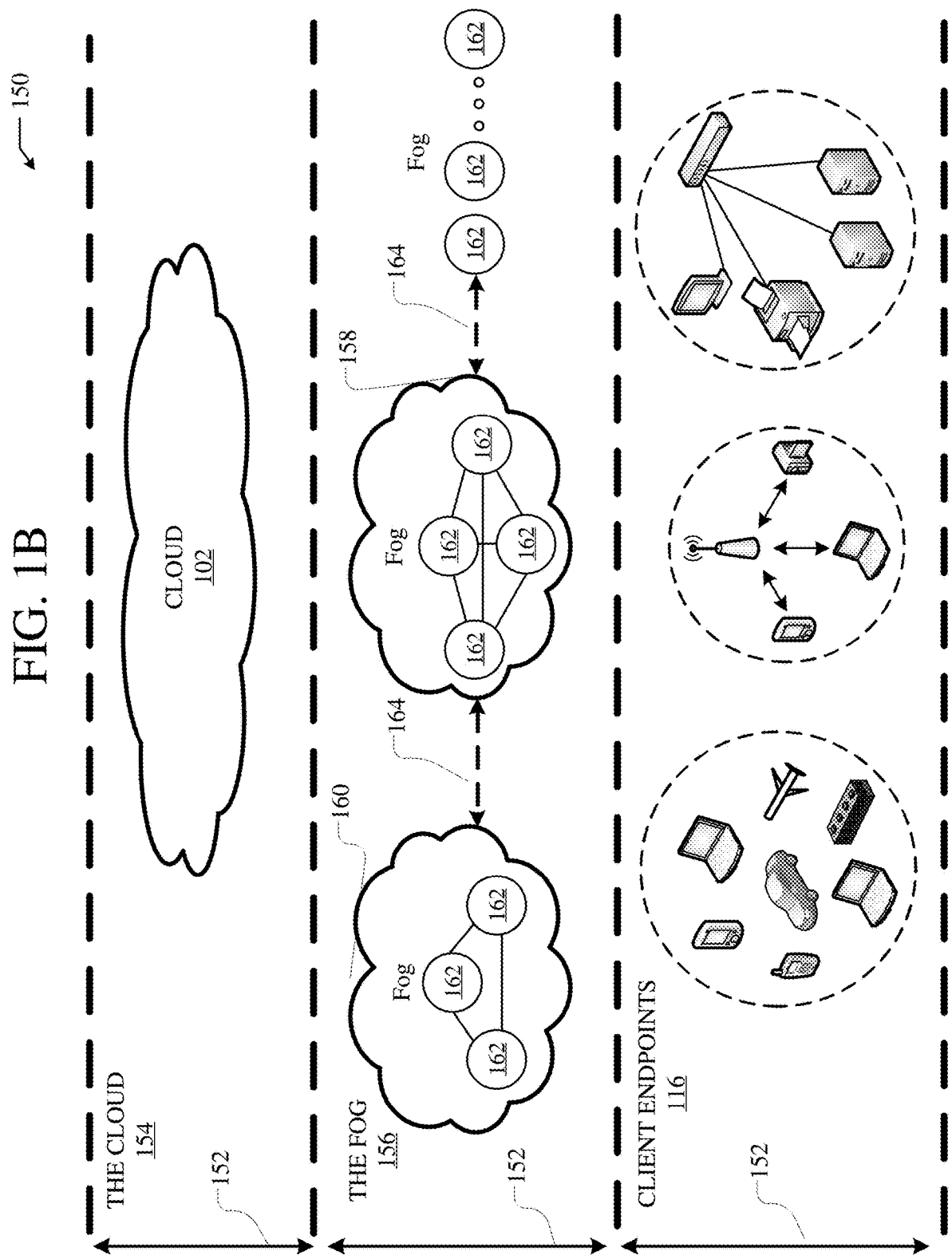
FIG. 1B illustrates an example fog computing architecture.
Figure 2:
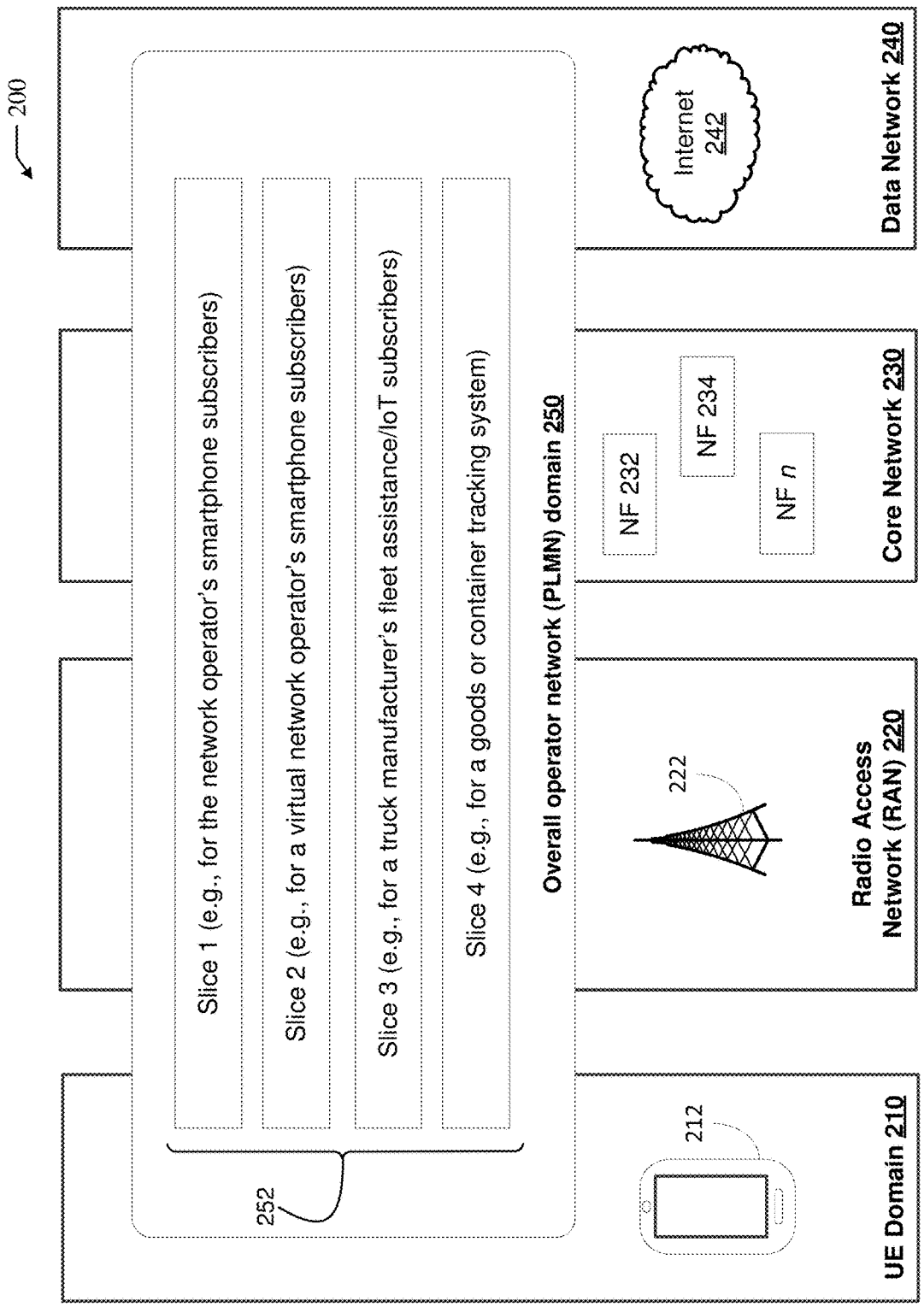
FIG. 2 depicts an exemplary schematic representation of a 5G network environment in which network slicing has been implemented, and in which one or more aspects of the present disclosure may operate.
Figure 7:
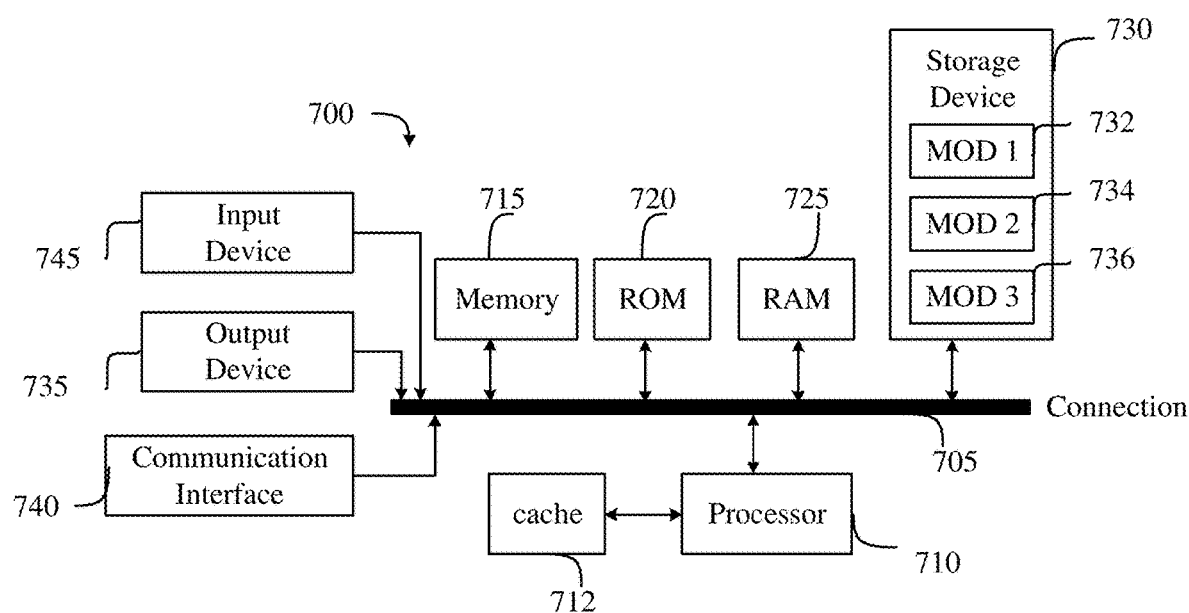
FIG. 7 illustrates an example computing system.
Figure 8:
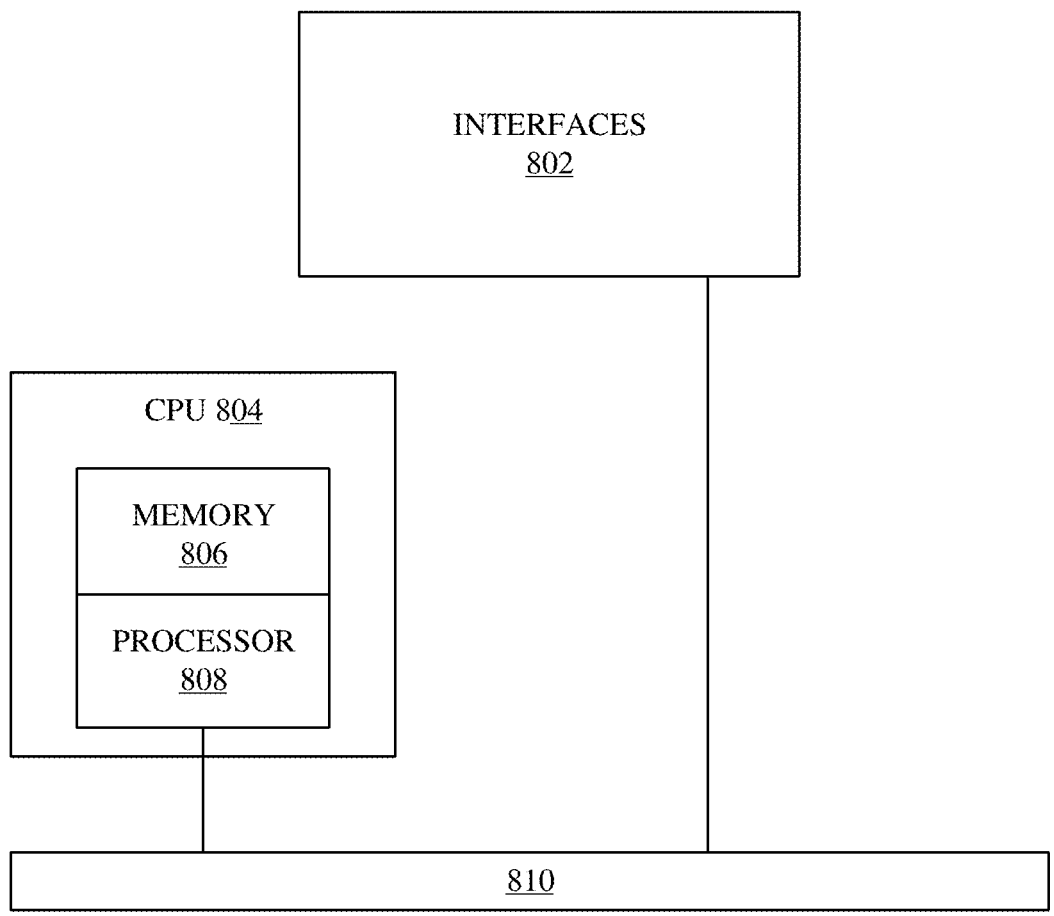
FIG. 8 illustrates an example network device.

A description of network environments and architectures for network data access and services, as illustrated in FIGS. 1A, 1B, and 2 is first disclosed herein. A discussion of systems, methods, and computer-readable medium for federating enterprises and SaaS providers using network slices, as shown in FIGS. 3-6, will then follow. The discussion then concludes with a brief description of example devices, as illustrated in FIGS. 7 and 8. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can be used to form part of a TCP connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can be used to provide various cloud computing services via the cloud elements 104-114, such as SaaSs (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2 depicts an exemplary schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically execute in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the Radio Access Network (RAN) 120, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices actually being used to provision the SaaSs to the enterprise. However, associating SaaSs and SaaS providers with network slices is extremely difficult to achieve without federation across enterprises, network service providers, e.g. 5G service providers, and SaaS providers.

Further, an enterprise/subscriber may be part of many network slices, across a plurality of different network service providers. This further complicates associating SaaSs and SaaS providers with network slices used to provide the SaaSs to the enterprise across the different network service providers.

Additionally, federation across enterprises, network service providers, e.g. 5G service providers, and SaaS providers is important with respect to maintaining security and enforcing policies. Specifically, federation can be used to ensure that policies of an enterprise for specific SaaSs are correctly enforced across network slices of one or more network service providers.

The present includes systems, methods, and computer-readable media for federating enterprises with SaaS providers across network slices provided by one or more network service providers. Specifically, a SaaS provided by a SaaS provider for provisioning by the SaaS provider to an enterprise can be recognized. Further, one or more network slices within a network, e.g. a 5G network, of a network service provider between the enterprise and the SaaS provider for provisioning the SaaS to the enterprise can be recognized. As follows, the SaaS provider can be federated with the enterprise across one or more network service providers, including the network service provider used to provision the SaaS to the enterprise. Specifically, the SaaS provider can be federated with the enterprise by uniquely associating the one or more network slices provided by the network service provider with the SaaS provisioned by the SaaS provider to the enterprise using the one or more network slices. Additionally, an OAuth client of the SaaS for the one or more network slices between the enterprise and the SaaS provider can be registered as part of federating the SaaS provider with the enterprise across the one or more network slices. Accordingly, enterprise client access to the SaaS through the one or more network slices can be controlled based on the OAuth client for each network slice of the one or more network slices.

Figure 3:
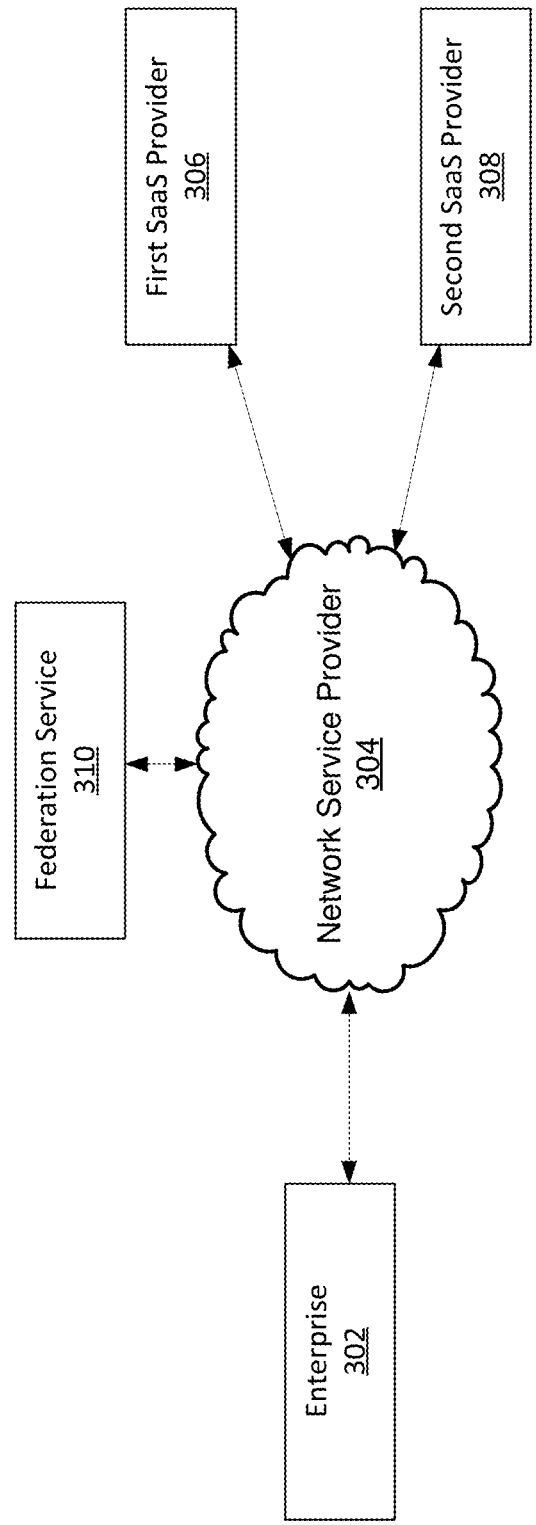
FIG. 3 shows an example environment for federating enterprises with SaaS providers across network slices.

FIG. 3 shows an example environment 300 for federating enterprises with SaaS providers across network slices. The example environment 300 shown in FIG. 3 includes an enterprise 302, a network service provider 304, a first SaaS provider 306, a second SaaS provider 308, and a federation service 310.

The enterprise 302 is intended to represent an applicable entity/business, including applicable devices associated with the entity/business. Specifically, the enterprise 302 can include devices for supporting a network of the enterprise 302. More specifically, the enterprise 302 can include devices in either or both a LAN and a WAN of the enterprise 302 used in providing network service access, e.g. to users. For example, the enterprise 302 can include client devices that are utilized by used to access network services, e.g. SaaSs, through the enterprise 302. The enterprise 302 can be implemented in an applicable domain/network environment. For example, the enterprise 302 can be implemented, at least in part, in the UE domain 210 through a plurality of user devices or other connected devices 212. Additionally, the enterprise 302 can be implemented, at least in part, in the data network 240, e.g. as part of cloud-based enterprise applications and services.

The network service provider 304 is intended to represent a network service provider and a network of the service provider that is utilized for provisioning network services. Specifically, the enterprise 302 can access network services, e.g. SaaSs, through a network of the network service provider 304. The network service provider 304 can be implemented in an applicable domain/network environment. For example, the network service provider 304 can be implemented in the overall operator network domain 250. Further, the network service provider 304 can provide a 5G network that is used to provision network services, e.g. to the enterprise 302. For example, the network service provider 304 can provide a 5G network environment that is used to provide the enterprise 302 with SaaSs through one or more network slices. While reference is made to the network service provider 304 including a 5G network, in various embodiments, the network service provider 304 can provide an applicable network that utilizes network slices to provision services, e.g. SaaSs, to the enterprise 302.

The first and second SaaS providers 306 and 308 are intended to represent SaaS providers and corresponding SaaSs provisioned by the SaaS providers to an applicable entity, e.g. the enterprise 302. Specifically, the first and second SaaS providers 306 and 308 can provision SaaSs to the enterprise 302 over a 5G network of the network service provider 304, e.g. using network slices. The SaaS providers 306 and 308 can be implemented in an applicable domain/network environment. For example, the SaaS providers 306 and 308 can be implemented in the data network 240. Additionally, the SaaS providers 306 and 308 can be implemented in an applicable cloud computing environment, such as the cloud computing architecture 100. In various embodiments, SaaSs provisioned by the first and second SaaS providers 306 and 308 are SaaSs that are not natively provisioned by the network service provider 304.

The SaaS providers 306 and 308 can be implemented as separate entities from the enterprise 302 and the network service provider 304. Specifically, the SaaS providers 306 and 308 can be third-party providers configured to host applications separate from the enterprise 302 and the network service provider 304. As follows, the SaaS providers 306 and 308 can provide output of the hosted applications to the enterprise 302 through the network service provider 304 while still remaining separate from the enterprise 302 and the network service provider 304. Specifically, the SaaS providers 306 and 308 can provide output of the hosted applications to the enterprise 302 over specific network slices in a network, e.g. 5G network, of the network service provider 304 as part of SaaSs to the enterprise 302 over network slices in a network of the network service provider 304. As the SaaS providers 306 and 308 are implemented separate from the enterprise 302 and the network service provider 304, the SaaS providers 306 and 308 and corresponding SaaSs typically remain unassociated with the network slices used to provision the SaaSs to the enterprise 302. As described previously, this can lead to deficiencies in managing provisioning of the SaaSs over the network slices. Specifically, this can lead to deficiencies in policy and security enforcement related to provisioning of the SaaS to the enterprise 302 over a network of the network service provider 304.

The federation service 310 functions to federate the enterprise 302 with the first and second SaaS providers 306 and 308 over a network of the network service provider 304. While federation is discussed, in the example environment shown in FIG. 3, with respect to two SaaS providers, in various embodiments, federation can occur between the enterprise 302 and a single SaaS provider. The federation service 310 can be implemented in conjunction with an applicable system for managing access in a network provided by the network service provider 304. For example, the federation service 310 can be implemented in conjunction with an AMF/MME of a 5G network of the network service provider 304. Further, the federation service 310 can be implemented, at least in part, in an applicable environment remote from the enterprise 302. For example, the federation service 310 can be implemented in the cloud 102 in the cloud computing architecture 100.

In federating the enterprise 302 with the first and second SaaS providers 306 and 308, the federation service 310 functions to associate the first and second SaaS providers with the enterprise 302. Specifically, the federation service 310 can associate the first and second SaaS providers 306 and 308 with the enterprise 302 based on provisioning of SaaSs by the first and second SaaS providers 306 and 308 to the enterprise 302 over the network service provider 304. More specifically, the federation service 310 can associate the first and second SaaS providers 306 and 308 with the enterprise 302 by associating specific SaaSs provided by the SaaS providers 306 and 308 with network slices used to provision the SaaSs to the enterprise 302. For example, the federation service 310 can associate a first SaaS provided by the first SaaS provider 306 with one or more first network slices of the network service provider 304 used to provision the first SaaS to the enterprise 302. Further in the example, the federation service 310 can associate either or both the enterprise 302 and the first SaaS provider 306 with the one or more first network slices of the network service provider 304 used to provision the first SaaS to the enterprise 302. In another example, the federation service 310 can associate a second SaaS provided by the second SaaS provider 308 with one or more second network slices of the network service provider 304 used to provision the second SaaS to the enterprise 302. Further in the example, the federation service 310 can associate either or both the enterprise 302 and the second SaaS provider 306 with the one or more second network slices of the network service provider 304 used to provision the second SaaS to the enterprise 302.

The federation service 310 can uniquely associate SaaSs with network slices used to provision the SaaSs to the enterprise 302. For example, the first SaaS provider 306 can use one or more dedicated network slices of the network service provider 304 to provisions a first SaaS to the enterprise 302. Subsequently, the federation service 310 can associate the one or more dedicated network slices used to provision the first SaaS to the enterprise 302 with the first SaaS. Additionally, the second SaaS provider 308 can use separate dedicated network slices of the network service provider 304 to provision a second SaaS to the enterprise 302. Subsequently, the federation service 310 can associate the separate dedicated network slices used to provision the second SaaS to the enterprise 302 with the second SaaS.

In federating the enterprise 302 with the SaaS providers 306 and 308, the federation service 310 can recognize SaaSs provided by the first and second SaaS providers 306 and 308 to the enterprise 302. Further, the federation service 310 can identify one or more network slices of a network provided by the network service provider 304 for provisioning the SaaSs to the enterprise 302. As follows, the federation service 310 can associate, e.g. using an OAuth token, the SaaSs with the one or more network slices to federate one or a combination of the enterprise 302, the SaaS providers 306 and 308, and the network service provider 304.

Based on the federation of one or a combination of the enterprise 302, the network service provider 304, and the first and second SaaS providers 306 and 308, SaaSs provisioned by the first and second SaaS providers 306 and 308 can be managed. Specifically, policies can be applied to traffic of a SaaS provided by the first SaaS provider 306 to ensure proper traffic flow in provisioning the SaaS by the SaaS provider 306 to the enterprise 302. Further, security policies can be applied to traffic of a SaaS provided by the second SaaS provider 308 to limit intrusion by an attacker in provisioning the SaaS by the SaaS provider 308 to the enterprise. For example, the enterprise 302 may want to avail OpenDNS/Umbrella services for all DNS transactions, use cloud access security broker (CASB) services from a cloud-native cloud access security broker, or collect security and user measurements for security analytics using malware protection. Further in the example, federation of the enterprise 302 and the first and second SaaS providers 306 and 308 can be used to enable these functionalities in SaaS provisioning to the enterprise 302. Further, network assurance of SaaS provisioning can be provided based on management of the SaaS provisioning through federation between the enterprise 302 and the first and second SaaS providers 306 and 308 across the network service provider 304.

In various embodiments, the enterprise 302 can select specific network slices to use in provisioning a specific SaaS to the enterprise 302. Subsequently, either or both the network service provider 304 and the SaaS providers 306 and 308 can use the selected network slices to provision the specific SaaS to the enterprise 302. Further, based on the selected network slices, the federation service 310 can uniquely associate the SaaS with the selected network slices to effectively federate one of the SaaS providers 306 and 308 with the enterprise 302.

Further, in various embodiments, the federation service 310 can federate the enterprise 302 with the SaaS providers 306 and 308 using SaaSs that are already being provisioned to the enterprise 302, e.g. SaaSs that the enterprise 302 has already bought into. For example, SaaSs provisioned to the enterprise 302 can be SaaSs that are not natively provided by the network service provider 304. Accordingly, the federation service 310 can dynamically associate a SaaS already provisioned to the enterprise 302 with one or more network slices as the SaaS is provisioned to the enterprise 302. Specifically, the federation service 310 can dynamically federate the enterprise with the SaaS providers 306 and 308 across the network service provider 304.

Figure 4:
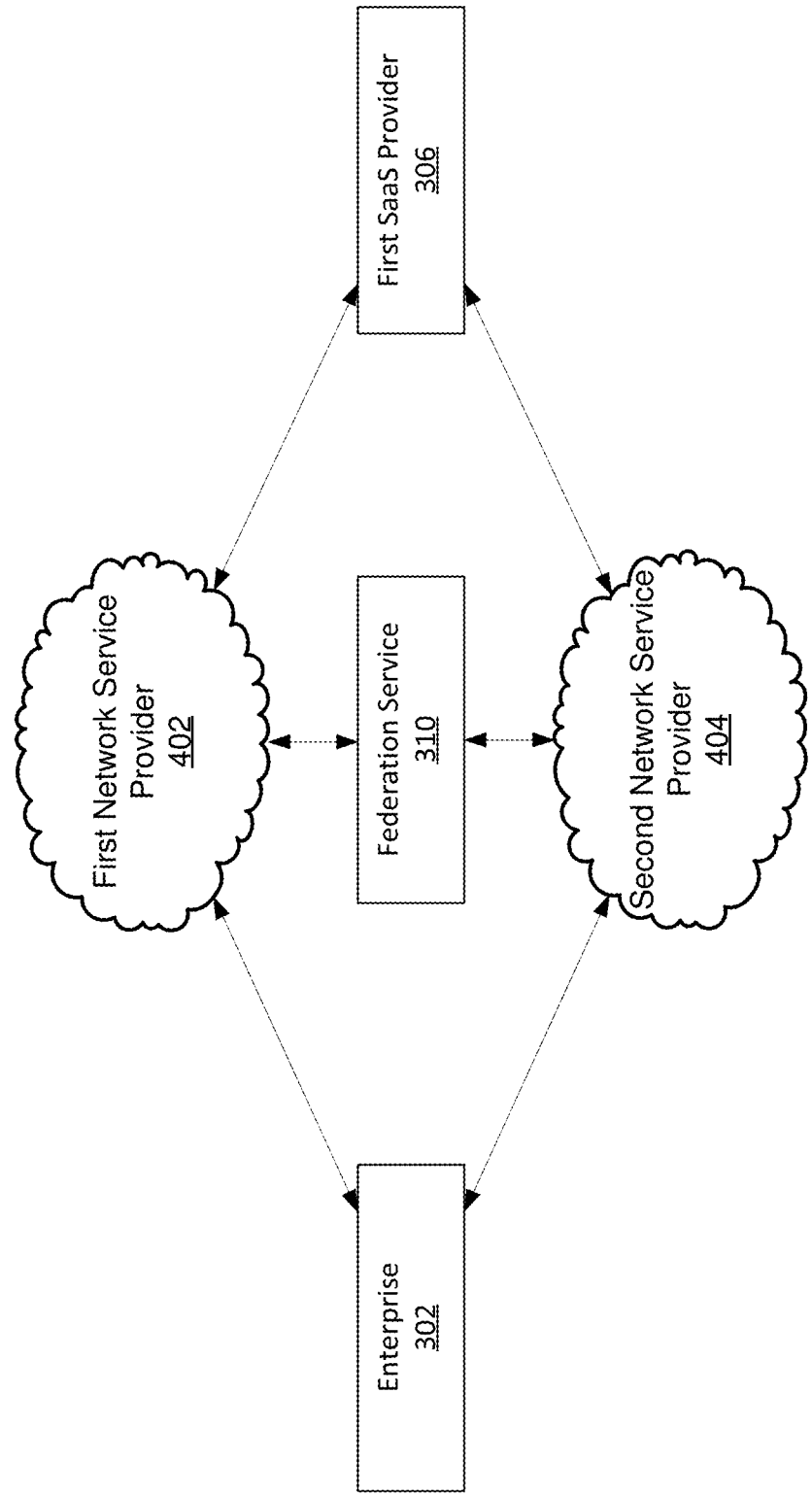
FIG. 4 shows an example environment for federating enterprises with SaaS providers across network slices of different network service providers.

FIG. 4 shows an example environment 400 for federating enterprises with SaaS providers across network slices of different network service providers. In the example environment 400, the first SaaS provider 306 can provision SaaSs to the enterprise 302 over a network of a first network service provider 402 and a network of a second network service provider 404. For example, the first SaaS provider 306 can provision a first SaaS to the enterprise 302 over network slices of a network provided by the first network service provider 402. Further in the example, the first SaaS provider 306 can provision a different second SaaS to the enterprise 302 over network slices of a network provided by the second network service provider 404.

The federation service 310 can federate the enterprise 302 with the first SaaS provider 306 based on the SaaSs provisioned by the first SaaS provider 306 to the enterprise 302. Specifically, the federation service 310 can federate the enterprise 302 with the first SaaS provider 306 based on network slices of the first network service provider 402 and the second network service provider 404 used to provision SaaSs to the enterprise 302. For example, the federation service 310 can uniquely associate a first SaaS with one or more network slices of the first network service provider 402 used to provision the first SaaS to the enterprise 302. Further in the example, the federation service 310 can uniquely associate a second SaaS with one or more network slices of the second network service provider 404 used to provision the second SaaS to the enterprise 302. In federating the enterprise 302 and the first SaaS provider 306 across different network service providers based on network slices used to provision SaaSs to the enterprise 302, the SaaSs can be managed based on the network slices used to provision the SaaS to the enterprise 302. For example, a security policy can be applied to traffic across one more network slices in the first network service provider 402 used to provision a first SaaS to the enterprise 302. Further in the example, a different security policy can be applied to traffic across one or more network slices in the second network service provider 404 used to provision a second SaaS to the enterprise 302.

Figure 5:
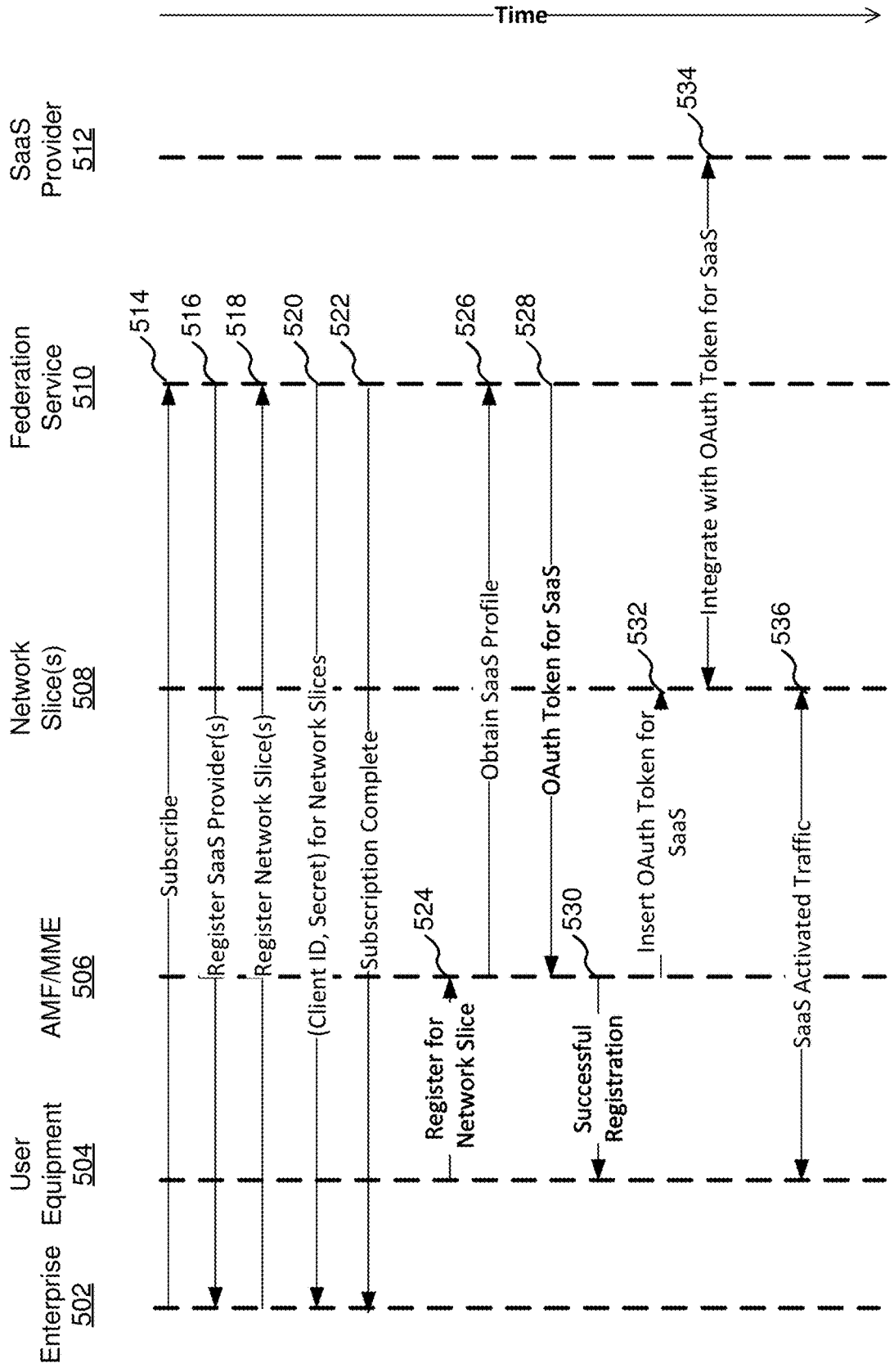
FIG. 5 shows an example timing diagram for federating an enterprise with a SaaS provider across a network service provider based on network slices used to provision SaaS to the enterprise.

FIG. 5 shows an example timing diagram 500 for federating an enterprise with a SaaS provider across a network service provider based on network slices used to provision SaaS to the enterprise. The example timing diagram 500 is discussed with reference to an enterprise 502, user equipment 504, e.g. within the enterprise 502, an AMF/MME 506, network slice(s) 508, a federation service 510, and a SaaS provider 512. The federation service 510 can function according to an applicable service for federating the enterprise 502 with the SaaS provider 512, such as the federation service 310 described herein.

The timing diagram 500 shown in FIG. 5 can be used to address the problem of federating an enterprise with a SaaS provider by associating a SaaS with one or more network slices of a network service provider using in provisioning the SaaS to the enterprise. Specifically, as shown in the timing diagram 500, an OAuth based federation service 510 can be used to address this problem. The federation service 510 can act as a broker between network service providers, e.g. 5G service providers, and other SaaS providers. More specifically, in the timing diagram 500, a network service provider can communicate with the federation service 510 to obtain necessary credentials, access, protocol, and other necessary parameters to insert/integrate with the SaaS provider 512. Accordingly, a network service provider does not need to build trusting relationships with each SaaS provider provisioning SaaSs through the network service provider.

At step 514 in the timing diagram 500 shown in FIG. 5, the enterprise 502 subscribes to the federation service 510. Specifically, in subscribing with the federation service 510, the enterprise 502 can register all or a portion of the SaaS providers, e.g. the SaaS provider 512, used by the enterprise 502. Additionally, in subscribing with the federation service 510, the enterprise 502 can register all network slices, e.g. the network slice(s) 508, from each network service provider used in provisioning SaaSs to the enterprise 502.

At step 516 in the timing diagram 500 shown in FIG. 5, SaaSs-SaaS resources/providers are registered. Specifically, SaaSs-SaaS resources/providers that the enterprise 302 wants to federate with the network slice(s) 508 are registered. For the SaaS registrations, the enterprise 502 can provide necessary details used in accessing the SaaS. For example, the enterprise 502 can provide credentials (tokens, certificates etc), integration endpoints, discovery mechanisms, and other SaaS expectations for accessing the SaaS. Further, the enterprise 502 can create scopes for each SaaS, e.g. to enable necessary authorization for protected resources owned by the enterprise in the SaaS. Specifically, different network slices may integrate with different scopes, and a network slice may only be allowed limited access as a result of such scopes.

At step 518 in the timing diagram 500 shown in FIG. 5, the network slice(s) 508, e.g. 5G network slice(s), are registered. In various embodiments, a network service provider can assign the network slice(s) 508 to the enterprise 502. As follows, the enterprise 502 can register the network slice(s) 508 that have been created for it across one or more service provider network. In registering the network slice(s) 508, OAuth clients for use in federating the enterprise 502 with SaaS providers, e.g. the SaaS provider 512 can effectively be created.

The enterprise 502 can choose to register an OAuth client for each network slice, e.g. network slice(s) 508. Additionally, the enterprise 502 can choose to have the same client for all network slices, e.g. network slice(s) 508. Specifically, the network slice(s) 508 can be assigned to one or more specific clients, e.g. user equipment 504. In particular, tokens related to the network slices(s) 508 can be distributed to specific clients of the user equipment 504.

In various embodiments, the enterprise 502 can create an OAuth client for each network slice(s) 508. Creating an OAuth client for each network slice can facilitate additional features in SaaS provisioning, such as individual revocation, isolation of audits/logs, and privacy enforcement.

At step 520 in the timing diagram 500 shown in FIG. 5, clients are assigned a client ID and a secret. The client IDs can be uniquely assigned to each client. In particular, the client IDs can be a unique identifier that ties the network slice(s) 508 of a particular network service provider to a specific SaaS. For example, the client IDs can include a network service identifier (NSI) itself, or an applicable identifier. Subsequently, at step 522, subscription of the enterprise 502 with the federation service 510 is completed.

In various embodiments, the enterprise 502 can define a SaaS policy for each OAuth client. A SaaS policy can define classification rules and conditions to enforce the SaaS as part of provisioning the SaaS. These rules can be used to govern the trigger for a network service provider to activate/enforce the SaaS for enterprise/subscriber traffic passing through a network of the network service provider, e.g. using the network slice(s) 508. Rules and conditions to enforce a SaaS, as used herein, can define classifications of flows subjected to or otherwise used in provisioning a SaaS. For example, rules can define enforcing Umbrella/OpenDNS for DNS traffic. In another example, rules can define enforcing cloud web security for HTTP traffic. In yet another example, rules can define lawful interceptions for HTTP traffic. Additionally, rules and conditions to enforce a SaaS can define user/device groups. Further, rules can define a location of a user, e.g. whether the user is in an enterprise network or a home network.

At step 524, in the example timing diagram 500 shown in FIG. 5, the enterprise 502, e.g. through the user equipment 504, registers for network slices. Specifically, when the enterprise 502 registers with the AMF/MME 506 to create a network slice, the enterprise 502 can provide the OAuth client ID and the secret created for a network slice. Additionally, the enterprise 502 can also instruct the AMF/MME 506 to query the federation service 510 for federation with a SaaS.

At step 526, the AMF/MME 506 can then use the client ID and the secret in communicating with the federation service 510. Specifically, at step 526, the AMF/MME 506, which can act as an OAuth client, can query the federation service 510, using the provided client ID and Secret, to discover the SaaS that needs to be inserted within the network slice. Specifically, the AMF/MME 506 can receive discovery results from the federation service 510. The discovery results can include applicable SaaS details, such as scopes used for federation and associated SaaS policies. The AMF/MME 506, using an OAuth client credentials grant with an appropriate scope, can request the federation service 510 for an access token to access the SaaS on behalf of the enterprise 502. Then, at step 528, the federation service 510 can provide the OAuth token for the SaaS back to the AMF/MME 506.

At step 530, the network slice is successfully registered. As follows, the AMF/MME 506, at steps 532 and 534, can install the SaaS policy on applicable network elements, e.g. for supporting the network slice(s) 508, and also provide the OAuth token so that these network elements can invoke/redirect/integrate with the SaaS. Specifically, the AMF/MME 506 can insert the OAuth token for the SaaS when communicating with the network slice(s) 508 and insert the OAuth token for the SaaS with the applicable network elements for supporting the network slice(s) 508.

Accordingly, at step 536, traffic from an enterprise/subscriber that traverses the network slice(s) 508 is first classified against the SaaS policy to determine if the traffic qualifies for a SaaS. If traffic qualifies for the SaaS, network elements supporting the network slice(s) can use the OAuth token to provision the SaaS using the traffic. Specifically, traffic to and from the user equipment 504/enterprise 502 can now be subject to policies, e.g. leading to redirection to a third party cloud.

Figure 6:
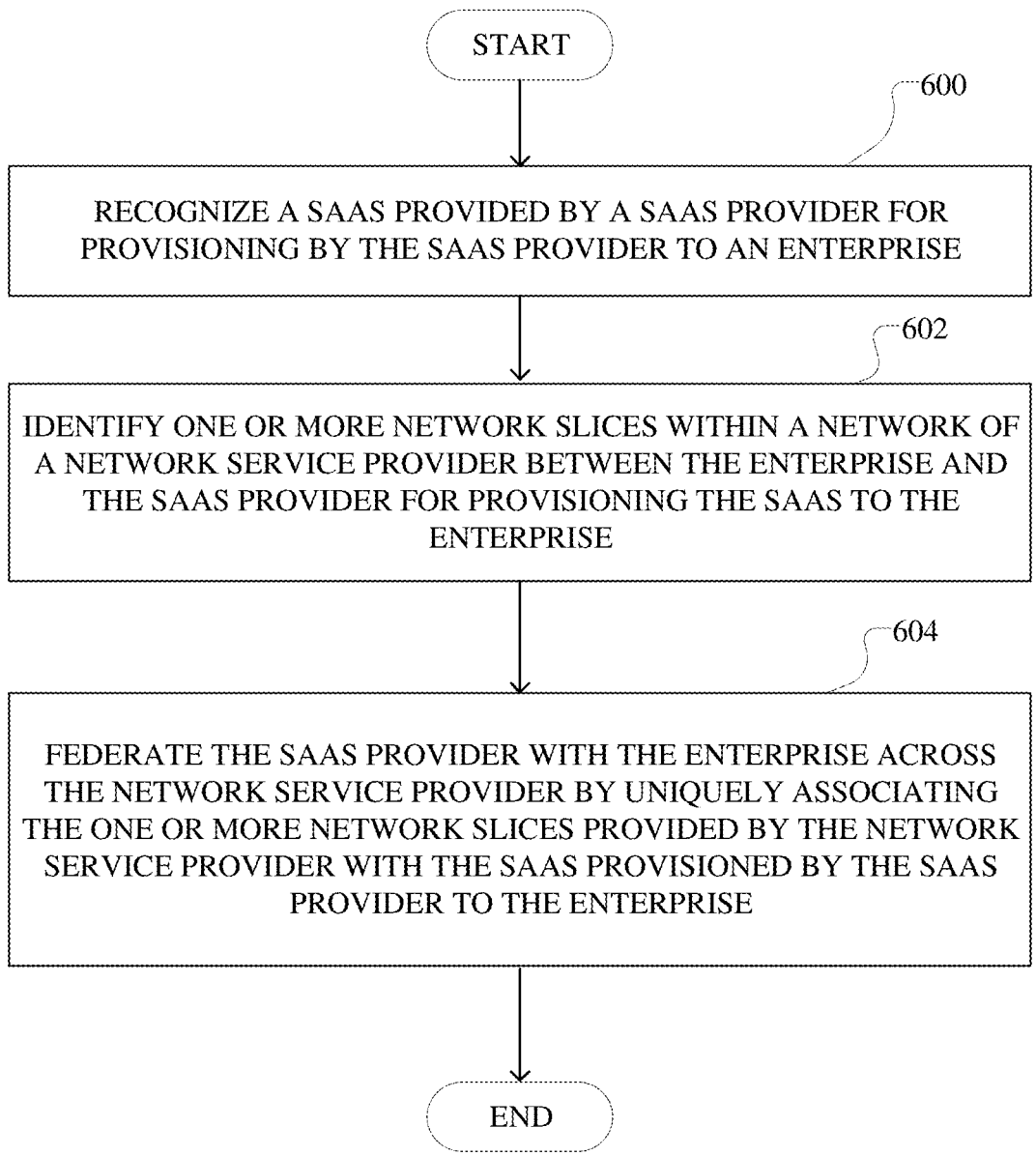
FIG. 6 illustrates a flowchart for an example method of federating an enterprise with a SaaS provider using network slices used to provision SaaSs to the enterprise.

FIG. 6 illustrates a flowchart for an example method of federating an enterprise with a SaaS provider using network slices used to provision SaaSs to the enterprise. The method shown in FIG. 6 is provided by way of example, as there are a variety of ways to carry out the method. Additionally, while the example method is illustrated with a particular order of steps, those of ordinary skill in the art will appreciate that FIG. 6 and the modules shown therein can be executed in any order and can include fewer or more modules than illustrated.

Each module shown in FIG. 6 represents one or more steps, processes, methods or routines in the method.

At step 600, a SaaS provided by a SaaS provider for provisioning by the SaaS provider to an enterprise is recognized. The SaaS provisioned by the SaaS provider can be recognized based on subscription of the enterprise to a federation service. Specifically, the SaaS provisioned by the SaaS provider can be recognized by the federation service provider as part of registering the enterprise for federated SaaSs across one or more network service providers.

At step 602, one or more network slices within a network of a network service provider between the enterprise and the SaaS provider are identified. Specifically, the one or more network slices can be used to provision the SaaS to the enterprise through the network of the network service provider. The one or more network slices can be identified as part of registering for the one or more network slices, e.g. with an AMF/MME associated with the network of the network service provider.

At step 604, the SaaS provider is federated with the enterprise across the network provider. Specifically, the SaaS provider is federated with the enterprise by uniquely associating the one or more network slices provided by the network service provider with the SaaS provisioned by the SaaS provider to the enterprise. The SaaS provider can be federated with the enterprise using an OAuth token generated for the SaaS.

FIG. 7 illustrates a computing system architecture 700 wherein the components of the system are in electrical communication with each other using a connection 705, such as a bus. Exemplary system 700 includes a processing unit (CPU or processor) 710 and a system connection 705 that couples various system components including the system memory 715, such as read only memory (ROM) 720 and random access memory (RAM) 725, to the processor 710. The system 700 can include a cache 712 of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

FIG. 8 illustrates an example network device 800 suitable for performing switching, routing, load balancing, and other networking operations. Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 804 to efficiently perform routing computations, network diagnostics, security functions, etc.

Although the system shown in FIG. 8 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
recognizing a software as a service (SaaS), provided by a SaaS provider, for provisioning by the SaaS provider to an enterprise;
identifying one or more network slices within a network of a network service provider between the enterprise and the SaaS provider for provisioning the SaaS to the enterprise; and
federating the SaaS provider with the enterprise across one or more network service providers, including the network service provider, by uniquely associating the one or more network slices provided by the network service provider with the SaaS provisioned by the SaaS provider to the enterprise;
wherein each of the network slices forms a complete Public Land Mobile Network (PLMN) for providing services to user equipment.

2. The method of claim 1, further comprising:
recognizing an additional SaaS, provided by a provider, for provisioning to the enterprise; and
federating the provider with the enterprise across the one or more network service providers, including the network service provider, by uniquely associating the one or more network slices provided by the network service provider with the additional SaaS provisioned by the provider to the enterprise.

3. The method of claim 2, wherein the provider of the additional SaaS is the SaaS provider provisioning the SaaS to the enterprise.

4. The method of claim 2, wherein the provider of the additional SaaS is a different SaaS provider from the SaaS provider provisioning the SaaS to the enterprise.

5. The method of claim 1, further comprising:
recognizing an additional SaaS, provided by a provider, for provisioning to the enterprise;
identifying one or more network slices of another network service provider between the enterprise and provider for provisioning the additional SaaS to the enterprise; and
federating the provider with the enterprise across the one or more network service providers, including the another network service provider, by uniquely associating the one or more network slices provided by the another network service provider with the additional SaaS provisioned by the provider to the enterprise.

6. The method of claim 5, wherein the provider of the additional SaaS is the SaaS provider provisioning the SaaS to the enterprise.

7. The method of claim 5, wherein the additional SaaS provisioned by the provider to the enterprise over the one or more network slices of the another network service provider is a same SaaS as the SaaS provisioned by the SaaS provider over the one or more network slices of the network service provider.

8. The method of claim 5, wherein the provider of the additional SaaS is a different SaaS provider from the SaaS provider provisioning the SaaS to the enterprise.

9. The method of claim 1, further comprising registering an Open Authorization ("OAuth") client of the SaaS for the one or more network slices between the enterprise and the SaaS provider as part of federating the SaaS provider with the enterprise across the one or more network slices, wherein enterprise client access to the SaaS through the one or more network slices is controlled based on the OAuth client for each network slice of the one or more network slices.

10. The method of claim 9, wherein registering the OAuth client of the SaaS for the one or more network slices includes generating an OAuth token of the SaaS for the one or more network slices, wherein the enterprise client access to the SaaS through the one or more network slices is controlled using the OAuth token.

11. The method of claim 10, wherein the OAuth token is generated based on an identifier of the SaaS uniquely associated with the one or more network slices between the enterprise and the SaaS provider.

12. The method of claim 9, further comprising receiving, from the enterprise, a SaaS policy for the OAuth client of the SaaS, wherein the enterprise client access to the SaaS through the one or more network slices between the enterprise and the SaaS provider is controlled based on the SaaS policy.

13. The method of claim 1, wherein the one or more network slices of the network service provider are assigned to the enterprise in response to the enterprise registering the SaaS with the network service provider, and the one or more network slices of the network service provider are assigned to the enterprise based on characteristics of scopes of the SaaS.

14. The method of claim 1, wherein the network of the network service provider is a 5G network.

15. A system comprising:
one or more processors; and
at least one non-transitory computer-readable storage medium having stored therein instructions which, when executed by the one or more processors, cause the one or more processors to perform operations comprising:
recognizing a software as a service (SaaS), provided by a SaaS provider, for provisioning by the SaaS provider to an enterprise;
identifying one or more network slices within a 5G network of a network service provider between the enterprise and the SaaS provider for provisioning the SaaS to the enterprise; and
federating the SaaS provider with the enterprise across one or more network service providers, including the network service provider, by uniquely associating the one or more network slices provided by the network service provider with the SaaS provisioned by the SaaS provider to the enterprise;
wherein each of the network slices forms a complete Public Land Mobile Network (PLMN) for providing services to user equipment.

16. The system of claim 15, wherein the instructions which, when executed by the one or more processors, further cause the one or more processors to perform operations comprising:
recognizing an additional SaaS, provided by a provider, for provisioning to the enterprise; and
federating the provider with the enterprise across the one or more network service providers, including the network service provider, by uniquely associating the one or more network slices provided by the network service provider with the additional SaaS provisioned by the provider to the enterprise.

17. The system of claim 15, wherein the instructions which, when executed by the one or more processors, further cause the one or more processors to perform operations comprising:
recognizing an additional SaaS, provided by a provider, for provisioning to the enterprise;

identifying one or more network slices of another network service provider between the enterprise and provider for provisioning the additional SaaS to the enterprise; and federating the provider with the enterprise across the one or more network service providers, including the another network service provider, by uniquely associating the one or more network slices provided by the another network service provider with the additional SaaS provisioned by the provider to the enterprise.

18. The system of claim 15, wherein the instructions which, when executed by the one or more processors, further cause the one or more processors to perform operations comprising registering an Open Authorization ("OAuth") client of the SaaS for the one or more network slices between the enterprise and the SaaS provider as part of federating the SaaS provider with the enterprise across the one or more network slices, wherein enterprise client access to the SaaS through the one or more network slices is controlled based on the OAuth client for each network slice of the one or more network slices.

19. The system of claim 18, wherein the instructions which, when executed by the one or more processors, further cause the one or more processors to perform operations comprising generating an OAuth token of the SaaS for the one or more network slices as part of registering the OAuth client of the SaaS for he one or more network slices, wherein the enterprise client access to the SaaS through the one or more network slices is controlled using the OAuth token.

20. A non-transitory computer-readable storage medium having stored therein instructions which, when executed by a processor, cause the processor to perform operations comprising:

recognizing a software as a service (SaaS), provided by a SaaS provider, for provisioning by the SaaS provider to an enterprise;

identifying one or more network slices within a network of a network service provider between the enterprise and the SaaS provider for provisioning the SaaS to the enterprise;

federating the SaaS provider with the enterprise across one or more network service providers, including the network service provider, by uniquely associating the one or more network slices provided by the network service provider with the SaaS provisioned by the SaaS provider to the enterprise; and registering an Open Authorization ("OAuth") client of the SaaS for the one or more network slices between the enterprise and the SaaS provider as part of federating the SaaS provider with the enterprise across the one or more network slices, wherein enterprise client access to the SaaS through the one or more network slices is controlled based on the OAuth client for each network slice of the one or more network slices;

wherein each of the network slices forms a complete Public Land Mobile Network (PLMN) for providing services to user equipment.

* * * * *